Nov. 3, 1959     L. E. WETHERHOLD     2,911,588
BRIDGE CIRCUITS
Filed Dec. 23, 1955
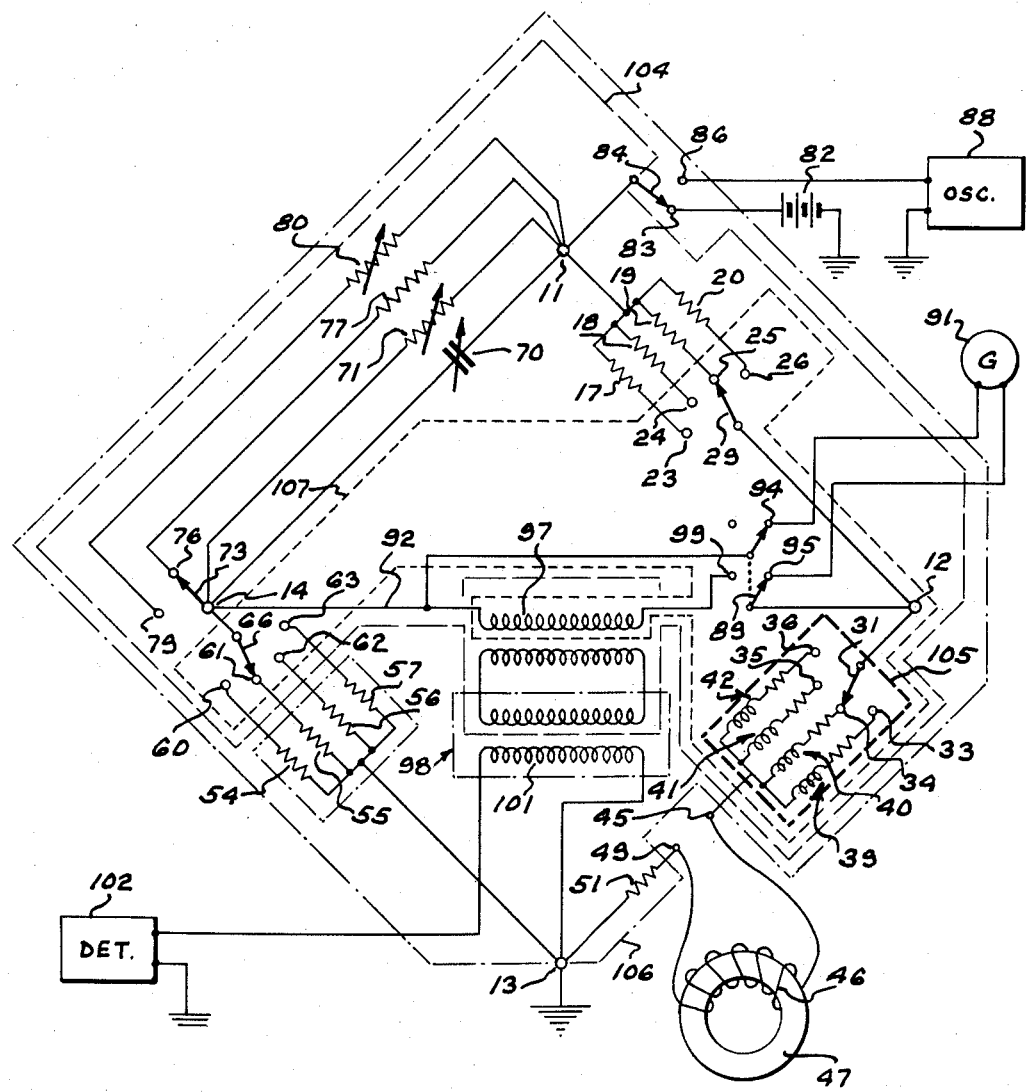
*INVENTOR*
*L. E. WETHERHOLD*
BY
*ATTORNEY*

United States Patent Office

2,911,588
Patented Nov. 3, 1959

---

2,911,588

BRIDGE CIRCUITS

Louis E. Wetherhold, Downers Grove, Ill., assignor to Western Electric Company, Incorporated, New York, N.Y., a corporation of New York Application December 23, 1955, Serial No. 555,018

6 Claims. (Cl. 324—34)

---

This invention relates to bridge circuits and more particularly to bridge circuits for determining core losses.

An object of this invention is to provide a bridge circuit for determining core losses of ferro-magnetic cores.

Another object of this invention is to provide a bridge circuit for determining the alternating current increment of resistance in coils wound on ferro-magnetic cores.

One embodiment of the invention may include a bridge circuit having a first variable conductance branch for balancing the bridge circuit to determine the direct current resistance of a coil winding on a core and connected to the bridge, using a battery and a galvanometer. A second variable conductance branch and a variable capacitance branch connected in parallel with each other and the first conductance branch are provided for balancing the bridge when an oscillator is substituted for the battery and a cathode ray detector is substituted for the galvanometer. The value of the second conductance branch then represents the effective alternating current resistance increment (the total alternating current resistance less the direct current resistance) of the coil winding and the value of the capacitance branch will represent the effective inductance of the core. The value of the second conductance branch can then be used to compute the actual value of the alternating current losses caused in the coil winding by magnetic properties of the core. The value of the capacitance branch can be used to compute the inductance of the core.

Other objects and advantages of the invention will become apparent by reference to the following detailed description and the accompanying drawing illustrating a preferred embodiment of the invention and disclosing a schematic diagram of the bridge circuit showing its components in normal position to balance the direct current resistance of the coil winding on the core.

Referring now in detail to the drawing, a bridge circuit is shown having four corner terminals 11, 12, 13 and 14. A plurality of resistances 17, 18, 19 and 20 of various values connected in parallel to the terminal 11 are provided with contacts 23, 24, 25 and 26, respectively. A contactor 29 connected to the terminal 12 is movable to engage one of the contacts 23—26 to connect one of the resistances between the terminals 11 and 12, the various values of the resistances providing for adjustment of the bridge circuit.

A contactor 31 connected to the terminal 12 is movable to engage one of a plurality of contacts 33, 34, 35 or 36 connected to series-connected resistances and inductances 39, 40, 41 and 42 which are connected in parallel to a terminal 45. A coil winding 46 of a "Permalloy" dust or other ferro-magnetic core 47 to be tested is connected to the terminal 45 and to another terminal 49 which is connected to the terminal 13 through a resistance 51 of known value. The voltage applied to the coil winding 46 can be determined by connecting a voltmeter (not shown) to the terminals 45 and 49. The current flowing in the coil winding is determined by measuring the voltage drop across the known resistance 51 and computing the current.

A plurality of resistances 54, 55, 56 and 57 of various values connected in parallel to the terminal 13 are provided with contacts 60, 61, 62 and 63, whereby a contactor 66 connected to the terminal 14 and movable to engage one of the contacts 60—63 can be used to connect one of the resistances 54—57 between the terminals 13 and 14, thereby permitting adjustment of that portion of the bridge connected between the terminals 13 and 14.

A variable capacitance 70 is connected between the terminals 14 and 11 for balancing the inductance of the coil winding 46 and core 47, and a first variable conductance 71 is connected between the terminals 14 and 11 for balancing the direct current resistance of the coil winding 46. The resistance value of the capacitance 70 is balanced by the inductance portions of the resistances and inductances 39—42. A contactor 73 connected to the terminal 14 is movable to engage a contact 76 to connect a resistance 77 between the terminals 14 and 11 or to engage a contact 79 to connect a second variable conductance 80 between the terminals 14 and 11, the variable conductance 80 being used to balance the alternating current resistance increment (the total alternating current resistance less the direct current resistance) of the coil winding 46. The value of the resistance 77 is equal to the minimum resistance value of the conductance 80 whereby, when the circuit is balanced using direct current power, movement of the contactor 73 to engage the contact 79 will not unbalance the circuit.

A grounded battery 82 supplies direct current power to the bridge circuit through a contact 83 and a contactor 84 connected to the terminal 11, the direct current flowing to ground through the bridge and the terminal 13 which is grounded. The contactor 84 may be moved to engage a contact 86 to disconnect the battery 82 from the bridge circuit and to connect an oscillator 88 of a well-known type across the bridge circuit. A switch 89 is set as shown in the drawing to connect a galvanometer 91 between the terminals 12 and 14 for balancing the direct current resistance of the coil winding 46, this connection being made through a conductor 92 and switch contacts 94 and 95. When the bridge is to be balanced using alternating current power supplied by the oscillator 88 the switch 89 is operated to connect a primary winding 97 of a transformer 98 between the terminals 12 and 14, this connection being made through the conductor 92 and a contact 99 of the switch 89. A secondary winding 101 is connected to the terminal 13 and to a grounded cathode ray detector 102 of a well-known type whereby, when alternating current flows in the primary winding 97 of the transformer 98, a current is induced in the secondary winding 101 and the detector 102 produces a signal to indicate that such current is flowing in the primary winding 97. Thus, when the bridge is balanced no signal will appear on the detector 102, since no current will be flowing in the conductor 92.

A plurality of shields 104, 105, 106 and 107 made of a non-magnetic material, such as brass, and illustrated diagrammatically in the drawing, are provided for shielding the various components of the bridge from stray inductances and capacitances, thereby reducing errors in the operation of the bridge. The shields 104, 105, 106 and 107 are connected to the terminals 11, 12, 13 and 14, respectively.

In operating the circuit to determine the alternating current core losses of a core 47 having a winding 46 connected to the terminals 45 and 49, the contactor 73 is set to engage the contact 76 to connect the resistance 77 between the terminals 14 and 11 and the contactor 84 is set to engage the contact 83 to connect the battery 82 to the bridge whereby direct current power will be supplied thereto. The switch 89 is set as shown in the drawing to connect the galvanometer 91 between the terminals 12 and 14 for determining the balance of the bridge, the bridge being balanced when the galvanometer 91 indicates that no current is flowing between the terminals 12 and 14. With direct current power applied to the bridge by the battery 82 the value of the first conductance 71 is manually varied until the galvanometer 91 indicates that the bridge is balanced, as described above.

The contactor 84 is then set to engage the contact 86 to disconnect the battery 82 from the bridge and to connect the oscillator 88 thereto, and the contactor 73 is set to engage the contact 79 to connect the second variable conductance 80 in the bridge and to disconnect the resistance 77 therefrom. The switch 89 is moved to engage the contact 99 to disconnect the galvanometer 91 and to connect the primary winding 97 of the transformer 98 between the terminals 12 and 14. The oscillator 88 is now adjusted to provide a desirable test voltage or current to be applied to the coil winding 46. The test voltage is measured by using a voltmeter (not shown) and measuring the voltage between the terminals 45 and 49. The test current is determined by measuring the voltage drop across the known resistance 51 and calculating the current. The bridge is now in condition to be balanced using alternating current power.

The second variable conductance 80 and the capacitance 70 are varied until the cathode ray bridge detector 102 indicates that no alternating current is flowing in the primary winding 97 of the transformer 98, the bridge being balanced when there is no current flowing in this primary winding 97. The value of the capacitance 70 represents the effective inductance of the coil winding 46 and core 47 and the value of the second conductance 80 represents the effective alternating current resistance increment of the coil winding 46. The actual core loss will then be a function of the value of the conductance 80 and the inductance of the core will be a function of the value of the capacitance 70. The value of the conductance 80 and the values of one of the resistances 17, 18, 19 or 20, (whichever is used in operation of the bridge), one of the resistances and inductances 39, 40, 41 or 42, and one of the resistances 54, 55, 56 or 57 are then used to compute the actual core loss. The resistances 17–20 and 54–57 and the series-connected resistances and inductances 39 and 42 are provided for adjustment of the bridge.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a system for determining core losses, four terminals, four branches connected to the terminals to form a loop, direct current power supply means connectable to two of said terminals on opposite sides of the loop, alternating current power supply means connectable to said two terminals, means for connecting the direct and alternating current supplies to said two terminals, resistances connected in two of said branches, a first variable conductance connected in a third branch of said branches for adjusting to zero the direct current potential difference between the other two of said terminals when a coil on a test core is connected in a fourth branch of said branches, a second conductance connected in said third branch in parallel with said first variable conductance, and capacitance means connected in the third branch in parallel with the first and second conductances.

2. In a bridge circuit for determining core losses and having four branches and two diagonals, direct current power supply means, alternating current power supply means, circuit means for alternately connecting the direct and alternating current power supply means across one diagonal of the bridge circuit, detecting means responsive to direct current flow, additional detecting means responsive to alternating current flow, switching means for alternately connecting said alternating and direct current detecting means across the other diagonal of the bridge circuit, resistance means connected in two of the branches of the circuit, means connected in a third branch of the circuit for adjusting to zero the direct current flow through said direct current flow detecting means when the direct current power supply is connected to said one diagonal, and conductance and capacitance means connected in the third branch of the circuit for adjusting to zero the alternating current flow through said alternating current flow detecting means when the alternating power supply current means is connected to said one diagonal.

3. In a bridge circuit for determining core losses and having four branches and two diagonals, direct current power supply means, alternating current power supply means, circuit means for alternately connecting the direct current and alternating current power supply means across one diagonal of the bridge circuit, direct current flow detecting means, alternating current flow detecting means, switching means for alternately connecting the direct and alternating current flow detecting means across the other diagonal of the bridge circuit, a plurality of resistances connected in two of the branches of the circuit, a first variable conductance connected in a third branch of the bridge circuit whereby when a coil winding on a core to be tested is connected in a fourth branch of the circuit the current flow through the direct current flow detecting means connected to the circuit can be adjusted to zero, a variable capacitance connected in the third branch of the circuit, and a second variable conductance connected in said third branch, said variable capacitance and said second variable conductance being provided for adjusting to zero the current flow through the alternating current flow detecting means connected to the circuit.

4. In a bridge for determining magnetic properties of a core by determining the losses in a coil wound on the core, said circuit having two diagonals and four branches connected in a closed loop, direct current power supply means, alternating current power supply means, circuit means for alternately connecting the direct current and alternating current power supply means across one diagonal of the bridge circuit, first detecting means responsive to a difference in direct current potential across the other diagonal of the bridge circuit, additional detecting means responsive to a difference in alternating current potential across said other diagonal of the bridge circuit, switching means for alternately connecting said first and said additional detecting means across said other diagonal, resistances connected in two of the branches of the bridge circuit, a first variable conductance connected in a third branch of the circuit for adjusting the difference in direct current potential across said other diagonal to zero when a coil winding to be tested is connected in a fourth branch of the circuit and direct current power is applied thereto, a second variable conductance connected in said third branch, and a variable capacitance connected in the third branch, said second variable conductance and variable capacitance being provided for adjusting the difference in alternating current potential across said other diagonal to zero when alternating current power is applied to the circuit.

5. In a system for determining core losses, four terminals, four branches connected to the terminals to form a closed loop, a first resistance connected in a first branch of said four branches, first variable conductance means connected in a second branch of said four branches, said first and second branches being adjacent to each other in said closed loop, means for applying a direct current voltage to two of said terminals on opposite sides of the loop with said first and second branches connected in series therebetween, a second resistance connected in a third branch of said four branches whereby when a coil wound on a core to be tested is connected in a fourth branch of said four branches the value of the first variable conductance means can be varied to reduce to zero the direct current voltage drop between the other two terminals, means for supplying an alternating current voltage to said two terminals, variable capacitance means connected in parallel with the first variable conductance means, and second variable conductance means connected in parallel with the first variable conductance means, the values of said capacitance means and said second variable conductance means being adjustable to reduce to zero the alternating current voltage drop between said other two terminals.

6. A bridge circuit for determining core losses comprising four branches connected in a closed loop, a first resistance connected in a first branch of said four branches, a variable capacitance connected in a second branch of said four branches, a plurality of variable conductances connected in said second branch in parallel with said variable capacitance, a second resistance connected in a third branch of said four branches, a fourth branch of said four branches having connected therein a coil wound on a core to be tested, means for applying a direct current voltage to opposite sides of the bridge in such a manner that direct current flows through parallel paths each including two branches connected in series, means for applying an alternating current voltage to said opposite sides of said bridge, first means interconnectable between intermediate points of said two parallel paths for indicating the balance of the bridge when the direct current voltage is applied thereto, and second means interconnectable between said intermediate points for indicating the balance of the bridge when the alternating current voltage is applied thereto, said variable capacitance and conductances in said second branch serving to balance the bridge first when the direct current voltage is connected thereto and then when the alternating current voltage is connected thereto.

References Cited in the file of this patent
UNITED STATES PATENTS 1,475,240     Osborne  --------------  Nov. 27, 1923